(12) United States Patent
Prendergast

(10) Patent No.: US 10,438,134 B2
(45) Date of Patent: Oct. 8, 2019

(54) DATA PROCESSING APPARATUS AND METHOD FOR AUTOMATICALLY GENERATING A CLASSIFICATION COMPONENT

(71) Applicant: Radiation Watch Limited, East Cowes, Isle of Wight (GB)

(72) Inventor: David Prendergast, Isle of Wight (GB)

(73) Assignee: Radiation Watch Limited, Isle of Wight (GB)

( * ) Notice: Subject to any disclaimer, the term of this patent is extended or adjusted under 35 U.S.C. 154(b) by 0 days.

(21) Appl. No.: 15/276,531

(22) Filed: Sep. 26, 2016

(65) Prior Publication Data
US 2017/0068907 A1 Mar. 9, 2017

Related U.S. Application Data

(63) Continuation of application No. 13/954,792, filed on Jul. 30, 2013, now abandoned, which is a (Continued)

(30) Foreign Application Priority Data

Jan. 10, 2007 (GB) .................................. 0700450.0

(51) Int. Cl.
*G06N 20/00* (2019.01)
*G06N 3/02* (2006.01)
(Continued)

(52) U.S. Cl.
CPC ............ *G06N 20/00* (2019.01); *G06F 17/16* (2013.01); *G06K 9/6227* (2013.01); *G06N 3/02* (2013.01);
(Continued)

(58) Field of Classification Search
None
See application file for complete search history.

(56) References Cited

U.S. PATENT DOCUMENTS 6,456,991 B1 9/2002 Srinivasa et al.
7,467,116 B2 12/2008 Wang

FOREIGN PATENT DOCUMENTS

WO    WO 2006/098766    9/2006

OTHER PUBLICATIONS

Kim, H., Pang, S., Je, H., Kim, D. and Bang, S.Y., 2003, Constructing support vector machine ensemble. Pattern Recognition, 36, pp. 2757-2767.
PCT, International Preliminary Report on Patentability, corresponding Application No. PCT/GB2008/000058, dated Jul. 14, 2009.
(Continued)

*Primary Examiner* — Li B. Zhen
*Assistant Examiner* — Daniel T Pellett
(74) *Attorney, Agent, or Firm* — Knobbe Martens Olson & Bear LLP

(57) ABSTRACT

Data processing apparatus operative to generate a classification component is disclosed. The data processing apparatus is configured to provide a template classifier bank comprising a plurality of classifier modules, each classifier module operative to receive training data comprising data elements having one of two or more known class affiliations and to output a class affiliation estimate value for each input data element. The data processing apparatus is further configured to derive a combination of the class affiliation estimate values providing a highest correlation to the two or more known class affiliations, and to generate a classification component formed of a resultant classifier bank comprising a combination of the plurality of classifier modules corresponding to the combination of estimate values providing the highest correlation.

34 Claims, 8 Drawing Sheets

Related U.S. Application Data continuation of application No. 12/522,904, filed as application No. PCT/GB2008/000058 on Jan. 10, 2008, now abandoned.

(51) Int. Cl.
  *G06N 5/02* (2006.01)
  *G06K 9/62* (2006.01)
  *G06F 17/16* (2006.01)
  *G06N 5/04* (2006.01)
  *G06N 7/00* (2006.01)

(52) U.S. Cl.
  CPC ............... *G06N 5/02* (2013.01); *G06N 5/047* (2013.01); *G06N 7/005* (2013.01)

(56) References Cited

OTHER PUBLICATIONS

Perrone, M. P. and L. N. Cooper (1993), When networks disagree: ensemble methods for hybrid neural networks, In R. J. Mammone (Ed.), Artificial Neural Networks for Speech and Vision, pp. 126-142, London: Chapman & Hall.

Tsymbal, A., Pechenizkiy, M., Cunningham, P., 2005, Diversity in search strategies for ensemble feature selection. Inform, Fusion 6 (1), 83-98.

Z.-H. Zhou, J. Wu, W. Tang, "Ensembling neural networks: many could be better than all" Artif. Intell., 137 (1-2) (2000), pp. 239-263.

Zhang-Quan Shen, Fan-Sheng Kong, "Dynamically weighted ensemble neural networks for regression problems," Machine Learning and Cybernetics, 2004, Proceedings of 2004 International Conference on, vol. 6, No., pp. 3492-3496, Aug. 26-29, 2004.

Configuration Database

DATA PROCESSING APPARATUS AND METHOD FOR AUTOMATICALLY GENERATING A CLASSIFICATION COMPONENT

RELATED APPLICATIONS

This application is a continuation of U.S. application Ser. No. 13/954,792, filed Jul. 30, 2013, which is a continuation of U.S. application Ser. No. 12/522,904, filed May 5, 2010, which is a National Phase of PCT/GB2008/000058, filed Jan. 10, 2008, which was published in English and designated the United States, and claims priority to GB Patent Application No. 0700450.0, filed Jan. 10, 2007. The disclosures of the above-described applications are hereby expressly incorporated by reference in their entireties.

FIELD

The present invention relates to data processing apparatus and a method, in particular but not exclusively for automatically generating a classification component.

INTRODUCTION

There are many different applications (domains) where the automated classification of data is utilised or desirable. One example is homeland security, where different types of security threats may be present either simultaneously or separately. The disparate nature of the threats in the homeland security domain makes new demands on the requirements for automated decision making. Threats in homeland security are broadly characterized as Nuclear, Radiological, Biological or Chemical. Each of these domains is characterized by a wide variety of different sensors and different operational regimes. Consequently, the resultant threat profiles are associated with widely different data characteristics. Furthermore, the nature of threats is expected to be constantly evolving as a consequence of the interplay between improved detection technology and increasing sophistication of the perpetrators causing the security threat.

For the avoidance of doubt, the term "threat" is primarily used herein to denote an actual instance of a threat, such as a Nuclear, Radiological, Biological or Chemical substance being present in an environment in which harm may occur to human beings.

Automated decision systems for determining the nature of a threat are suitable for determining Homeland Security threats as they may be implemented in environments unsafe for humans or where continuous consistent monitoring unsuitable for human implementation is required. Homeland security presents a uniquely challenging environment for automated decision systems. Without reconfiguration (re-training) conventional systems may perform sub-optimally as external conditions (the type and nature of threats) change. Typically the answer to this problem is to deploy adaptive systems, which are updated to track changes in external conditions. Such systems need to be adaptive, enabling the system to reconfigure itself to match changing external conditions. Furthermore, the system may contain some measure of sufficiency, in order to enable the system to assess whether the current configuration is able to achieve accurate performance, although this is not essential.

Aspects and embodiments of the invention were devised with the foregoing in mind.

SUMMARY

Viewed from a first aspect there is provided data processing apparatus operative to generate a classification component, said data processing apparatus configured to provide a template classifier bank comprising a plurality of classifier modules, each classifier module operative to receive training data comprising data elements having one of two or more known class affiliations and to output a class affiliation estimate value for each input data element, said data processing apparatus further configured to derive a combination of said class affiliation estimate values providing a highest correlation to said two or more known class affiliations, and to generate a classification component formed of a resultant classifier bank comprising a combination of said plurality of classifier modules corresponding to said combination of estimate values providing said highest correlation.

By using such an arrangement, a classification system may be implemented which comprises many different classifiers not all of which are necessary or desirable for a range of classification applications to which the system will be put, but the system can be automatically configured with an optimum combination of classifier modules for a particular type of classification application to which the system is to be put. Thus, a generic classifier template may be used in order to cope with unanticipated classification problems, and a suitable classification bank derived from that generic template for particular classification applications. This saves time, cost and effort in designing classification systems.

Particularly, the resultant classifier bank comprises a sub-set of said plurality of classifier modules forming said template classifier bank, so that only those classifiers which provide the greatest contribution to classification accuracy are used for the resultant classifier bank.

Suitably, the system can deselect classifier modules from said template classifier bank to generate said resultant classifier bank, or apply a zero weighting to outputs of said template classifier bank not corresponding to said combination of estimate values providing said highest correlation to generate the resultant classifier bank.

The data processing apparatus may be configured such that said combination of class affiliation estimate values provides respective highest correlation values to said two or more known class affiliations, and to generate said resultant classifier bank comprising a combination of said plurality of classifier modules corresponding to said combination of class affiliation estimate values providing said respective highest correlation values.

Optionally, said highest correlation is represented by a highest correlation value derived from a mathematical combination of said class affiliation estimate values, and said resultant classifier bank comprises a combination of said plurality of classifier modules corresponding to said combination of class affiliation estimate values providing said highest correlation value.

Suitably, said mathematical combination comprises a mean value of said class affiliation estimate values. The mean value may be an arithmetic mean, or some other suitable mean value.

Regression analysis may be used to analyse said class affiliation estimate values in order to derive said combination of class affiliation estimate values.

The data processing apparatus may be further configured to input said class affiliation estimate values whose combination provided said respective highest correlation to each of said plurality of classifier modules of said template classifier bank to obtain further class affiliation estimate values and to derive a combination thereof which provides a further highest correlation to said two or more known class affiliations, and to generate a multi-stage classification component formed of said resultant classifier bank and a further resultant classifier bank comprising a combination of said plurality of classifier modules corresponding to said combination of further class affiliation estimate values providing said further highest correlation for said further highest correlation being greater than said highest correlation, and to arrange said multi-stage classification component such that class affiliation estimate values output from classifier modules of said resultant classifier bank are input to classifier modules of said further resultant classifier bank.

In this way a second stage classifier bank may be generated, but using the output of the resultant classifier bank as its input, and only utilised if the resulting correlation match is an improvement on the classification.

As before, said further resultant classifier bank comprises a sub-set of said plurality of classifier modules forming said template classifier bank.

Suitably, the system can deselect classifier modules from said template classifier bank to generate said further resultant classifier bank, or apply a zero weighting to outputs of said template classifier bank not corresponding to said combination of estimate values providing said highest correlation to generate the further resultant classifier bank.

The combination of further class affiliation estimate values may provide respective highest correlation values to said two or more known class affiliations, and to generate said further resultant classifier bank comprising a combination of said plurality of classifier modules corresponding to said combination of further class affiliation estimate values providing said respective highest correlation values.

Optionally, said highest correlation is represented by a highest correlation value derived from a mathematical combination of said further class affiliation estimate values, and said further resultant classifier bank comprises a combination of said plurality of classifier modules corresponding to said combination of further class affiliation estimate values providing said highest correlation value.

The mathematical combination may comprises a mean value of said further class affiliation estimate values, such as an arithmetic mean.

The data processing apparatus may be further configured to analyse said further class affiliation estimate values using regression analysis in order to derive said combination of further class affiliation estimate values.

Typically, said data elements are representative of source data of said known class affiliation. That is, said data elements are a reduced set of data elements which do not directly represent the source data but are derived from it. This means that there are less data points which can reduce the source of errors.

Typically, the data is normalised.

The regression analysis may be a uni-variant regression analysis or multiple regression analysis.

Suitably, multiple regression analysis is selected from the group consisting of: linear multiple regression; non-linear multiple regression; logistical regression and canonical regression.

Viewed from a second aspect, there is provided data processing apparatus configured to:
  receive a multivariate data set comprising a plurality of data elements;
  select from said data set a sub-set of data elements each data element of said sub-set having a deviation from a norm of said data set exceeding a threshold value; and
  remove from said sub-set data elements having a contribution to the representation of said multivariate data set by said sub-set less than a second threshold value to form a final data set representative of said multivariate data set with a reduced number of sources of error.

Such an arrangement provides a feature selection and extraction process which reduces the amount of data to a data set having fewer members than the original data set which may reduce the sources of error.

The data processing apparatus may be further configured to derive said final data set by linearly combining data elements of said sub-set to provide an optimal representation of said multivariate data set.

Suitably, said optimal representation is in terms of the variance of the multivariate data set.

Optionally, w said optimal representation is in terms of the uniformity of variance of the multivariate data set.

In a particular embodiment the data processing apparatus is further configured to select said sub-set of data elements by:
  obtaining and ordering the Karhunen Loève coordinate axes for said multivariate data set; and
  selecting respective data elements for said sub-set from a n member row of said multivariate data set from positions in said row matrix corresponding to the column position of a maximum magnitude element of respective Karhunen Loève coordinate axes vectors in order of greatest to least variance of the Karhunen Loève coordinate axes vectors.

The final set may be derived by applying a second Karhunen Loève expansion to said sub-set.

Typically, the data elements of said multivariate data set are normalised.

The deviation may comprise a deviation based on a least mean square estimate. Optionally, the deviation may comprise the variance of a respective data element.

Viewed from a third aspect, there is provided data processing apparatus operative as a classification component and configured to:
  provide a first classifier bank comprising a plurality of classifier modules arranged to receive data elements representative of multivariate data;
  provide a second classifier bank comprising a second plurality of classifier modules including at least one classifier module which is the same as a classifier module included in said first classifier bank; and
  input class affiliation estimate values output from said first classifier bank to said second classifier bank.

This is a run-time mode of the invention, and may use the automatically generated multi-stage classification component to produce optimal classification results Conveniently, the first and second classifier bank are derived from a common classifier bank template.

The data processing apparatus may be further configured to implement the feature selection and extraction process for providing said final data set representative of said multivariate data set to said first classifier bank. The same feature selection and extraction process may also be applied for providing a final data set representative of a multivariate data set output from said first classifier bank to said second classifier bank.

One or more embodiments of the present invention may provide a technology which underlies a decision support development environment for threat detection such as the Advanced Threat Engine™ developed by Radiation Watch Limited of Cowes, UK (RWL)—The Threat Engine™ may provide a framework for providing for the automatic construction of decision support systems. This automatic generation capability allows the system to reconfigure its internal complexity to match the requirements of a current threat domain. The Threat Engine™ may provide a generic decision support mechanism, which can be integrated into large scale command and control applications or provide stand alone classification systems.

The RWL Threat Engine™ may incorporate both desirable features identified above. Additionally, the Threat Engine™ also includes a number of innovations which represent substantial improvements on presently available approaches.

The core technology underpinning the Threat Engine™ is a new approach to statistical decision making, a meta-pattern recognition (mpr) engine. This engine applies the principles of pattern recognition to the pattern recognition process itself. Thus enabling utilization of higher (meta) level information pertaining to both the data being classified and the operation characteristics of the recognition systems performing the classification. Uniquely the system can be used to construct classification systems or classify data. Classification is different from decision support. The distinction used herein is that although decision support information may be based on classification results, the decision support information is augmented with additional context data to provide an informative response. Furthermore, several classification results may be integrated into one decision support report.

LIST OF FIGURES

DETAILED DESCRIPTION

Figure 1:
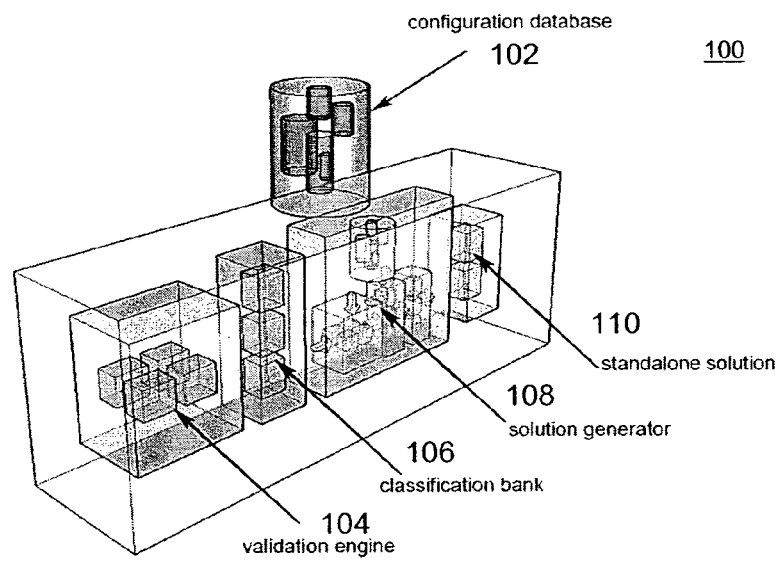
FIG. 1 is a schematic illustration of a general overview of a threat engine system.

Embodiments of the present invention will now be described, by way of example only, and with reference to the Figures listed above. One or more embodiments of the present invention may be included in a system such as the RWL Threat Engine. In general overview RWL's Threat Engine™ 100 consists of several distinct sub-systems or components as illustrated in FIG. 1:

The configuration database 102: The system requires configuration information at various levels, and such information is stored in the configuration database.

The validation engine 104: This provides an exception reporting mechanism, whereby changes in the nature of the underlying data can be flagged. Specifically the validation engine 104 produces a number of exception reports; —

Outlier-data corruption report.

Trend analysis report.

Sufficiency report.

The meta-pattern recognition (mpr) classifier bank 106: the output of the system, either in classification mode or in "solution generator" mode results from the simultaneous application of several different classifiers. For example, an implementation may include several variants of discriminative hyperplane classifiers including a support vector classifier, a number of kernel based approaches, some scale nearest neighbour approaches, a some neural net classifiers (MLP and functional link nets). In the described example, all the systems classifiers are marshaled through the mpr classifier bank.

The solution generator 108. The solution generator automatically generates stand-alone decision support systems 110.

Each of the components outlined above will now be described in general outline.

Validation Engine

Figure 2:
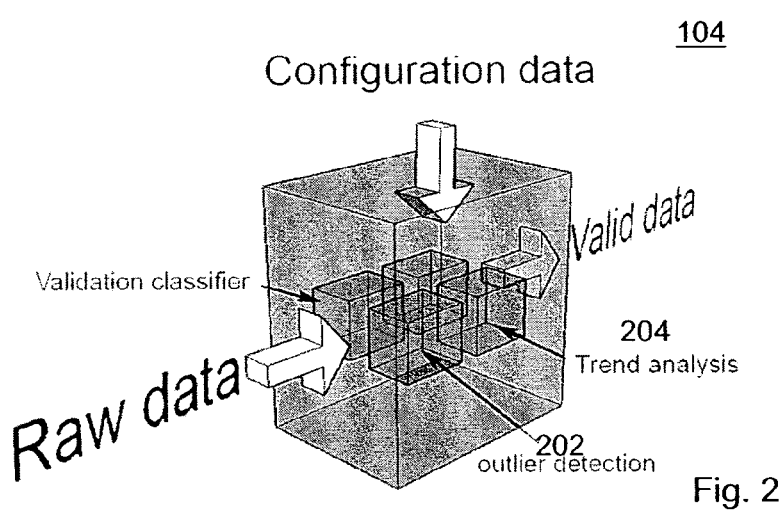
FIG. 2 is a schematic illustration of data validation component for a threat engine system.
Figure 3:
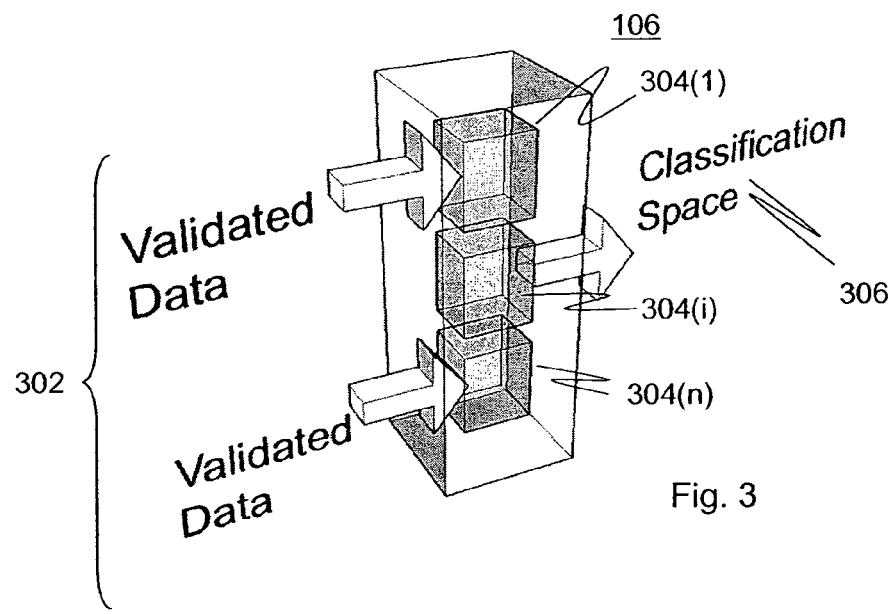
FIG. 3 is a schematic illustration of classification component for a threat engine system.
Figure 4:
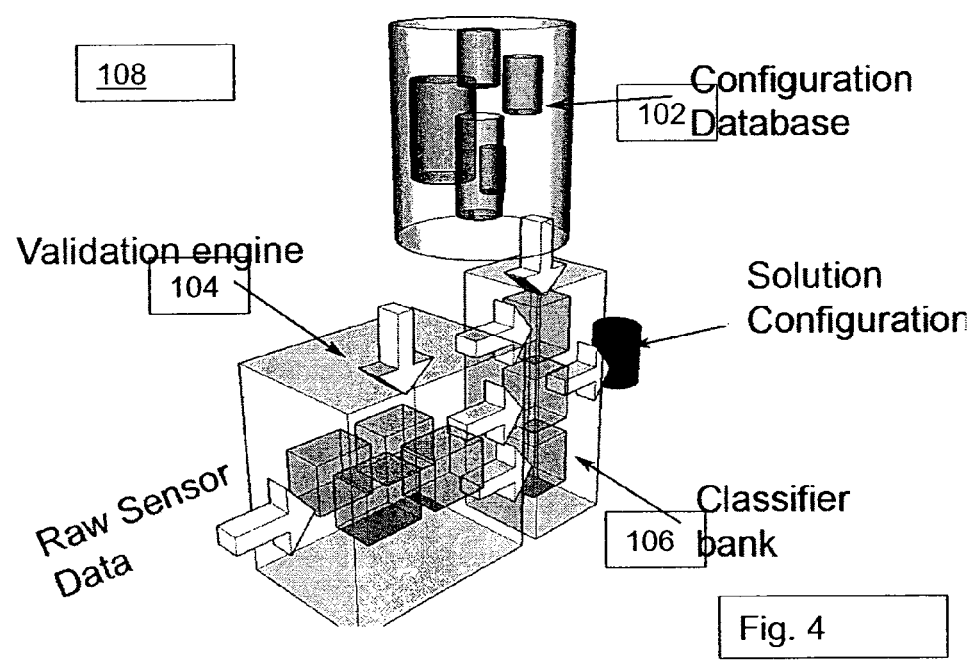
FIG. 4 is a schematic illustration of component for a threat engine system.

The validation engine 104 is schematically illustrated in FIG. 2 and is responsible for ensuring that the information passed along to the rest of the system is valid. Valid in this context covers the concept of both non-corrupt data and the concept of tracking non-stationary behaviour i.e.

(1) Ensuring that the instantaneous data is within the prescribed limits, which are consistent with data used as training data (this is sometimes referred to as outlier detection 202).

(2) Trend analysis 204 to assess whether the nature of the underlying data is changing.

More unusually the validation engine 104 may also be responsible for performing sufficiency analysis, to assess whether or not the internal complexity of the current classification system matches the expected complexity of the problem domain.

The validation engine 104 does more than simply provide conventional trend analysis, outlier detection and sufficiency analysis. A unique feature which may be implemented in the validation engine is the use of validation classifiers 206. A central idea used repeatedly in the Threat Engine™ is to reduce internal configuration decisions into classification problems. In this case, questions of data validity and system sufficiency are mapped onto problems of classification. For one embodiment, in the actual implementation multiple class-affiliation labels are used to represent greater degrees of subtlety than simply pass of fail. Once recast in this way the automatic solution generator 108 may be used to produce validation classifiers, used to augment convention outlier detection 202 and trend analysis 204 modules.

Classifier Bank

A core concept in the Threat Engine™ 100 approach to the automatic generation of decision support systems is the Meta-Pattern Recognition (MPR) classifier bank 106.

Traditional approaches to statistical pattern recognition deal with data representation and classification as separate entities. Consider the definition of pattern recognition as a problem of identifying the most relevant features and classification schemes for a particular data set. If the relevance can be decided by a pattern recognition system, then theoretically we can recursively apply pattern recognition techniques to the problem of pattern recognition (although the method for doing this is not immediately obvious). Such a scheme could be viewed as a hierarchy, each level corresponding to another application of the pattern recognition procedure. Such a hierarchical or Meta-pattern recognition system removes the boundary between classification and data representation Meta pattern recognition was a term used by Batchelor [1] to describe such a hierarchical system. This may circumvent a number of problems inherent in pattern recognition systems; feature selection and extraction become part of the algorithmic problem, as does the selection of the best classification scheme. The affects of peaking may be ameliorated, as the reduction of dimensionality is also intrinsic to the solution.

In an MPR system a bank of classifiers is applied to an input data set 302, each classifier 304 providing an estimate of class affiliation. The output from the classifier bank is itself a multivariate data set, which may be thought of as defining an n-dimension "classification space" 306. The formation of such a space bestows a number of benefits, not least the ability to compare classifier implemented at different dimensionality and using a variety of different classification approaches.

Solution Generator

The Threat Engine™ 100 can be used to generate standalone decision support systems. The part of the system responsible for this is the solution generator 108.

The output from the solution generator 108 is a set of configuration information which enables the system 100 to reconfigure its internal structure to match the current data requirements. The solution generator uses the output from the classification bank 106.

The solution generator 108 assumes that the classification space is formed from training data, i.e. data for which the class affiliation information is known. Consequently, the class affiliation information is available and may be incorporated (in the form of a vector) to form a secondary "enhanced" classification space. The advantage of this is that the selection of a set of classifiers which optimally represent the information in this "enhanced" space provides a solution to a number of issues; —

(1) Deciding classifier appropriateness
(2) Combining the results from multiple classifiers 304 (which in turn provides a partial solution to the problem of data fusion, although this could be argued as no more than probability encoding).
(3) Classifier bank sufficiency, the class affiliation vector in the enhanced classification space is a low dimensional object in a high dimensional space. The degree to which the class affiliation vector can be explained by the set of classification results in the classification space, gives an indication as to the sufficiency of classifiers 304 currently in the classification bank 106.

If the majority of the classifiers 304, currently in the classifier bank 106, perform poorly, then the contribution of the more appropriate classifiers could be swamped by the "noise" from a large number of inaccurate classifiers. It should be remembered that classification space 306 merely represents the output from a set of classifiers 304 in a comparable form. If the set of classifiers 304 contained in the classifier bank 105 were inappropriate, or the information the input data 302 inadequate, then the output from the classification space 306 might not contain sufficient information to support accurate classification. In the classification space the criterion for information redundancy is determined relative to the class affiliation information. A number of possibilities exist as to how this information may be best represented, for example feature extractions and/or a feature selection approach could be used to select a discriminative set of classifiers on the basis.

The appropriateness of the classifiers in the classification bank 106 is maintained by the removal of classifiers which produce results uncorrelated with the class affiliation vector. In the current Threat Engine™ system 100 implementation this is achieved by selecting the set of classifiers which has the maximum multiple correlation coefficients with the class affiliation vector. A branch and bound search may be used to obtain the classifier subset for a range of different dimensionalities. In the described embodiment the Threat Engine™ system 100 uses linear multivariate regression to explain the information in the class affiliation vector, from which can be obtained measures of sufficiency (coefficient of determinacy) and data combination (multiple correlation coefficients). However, the use of linear multiple correlation is not a restriction of the approach, any statistically robust method can be used to explain the class affiliation vector.

An orthogonal space, retrenched classification space, is formed around the class affiliation using the selected classifier results. Retrenched classification spaces can be formed hierarchically i.e. a set of classifiers may be applied to the data expressed in the classification space to enhance separation. By means of this hierarchy the boundary between data representation and classification is blurred. This process allows a meta-pattern recognition system to expand and contract its internal complexity to match the variety of the problem under consideration.

Overview of Data and Information Flow

Figure 5:
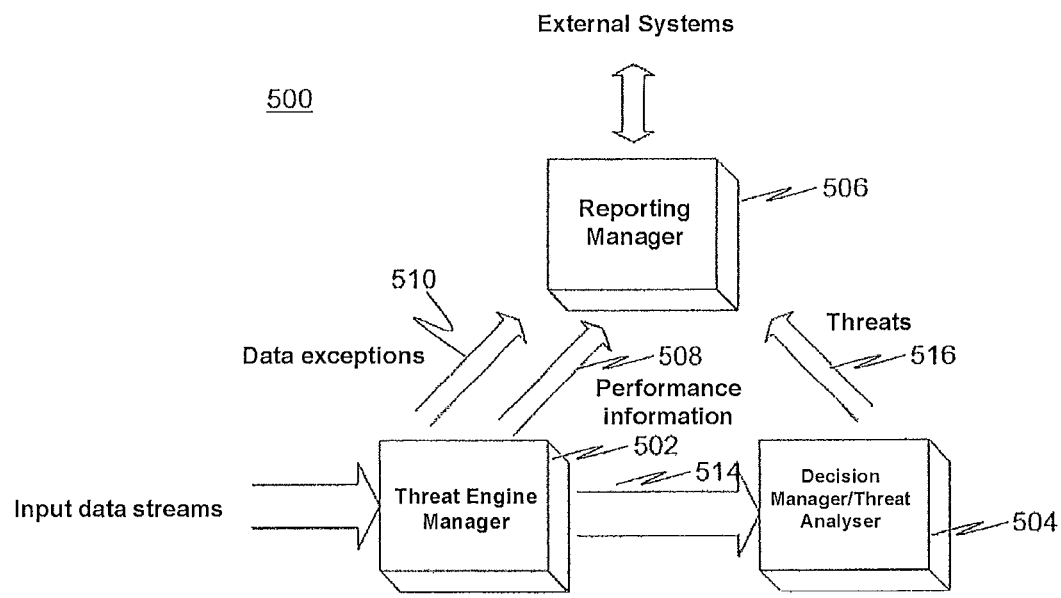
FIG. 5 is a schematic illustration of an overview of data and information flow in a threat engine system.

Data and information flow at an implementation level of RWL's Threat Engine™ system 100 for one embodiment is schematically illustrated in FIG. 5:

Threat Engine™ system Manager 502—processes the input data streams to classify the threats Decision Manager 504—combines information from different data streams along with relevant context information to generate threats Reporting Manager acts as a central repository for all information generated by the system.

Threat Engine™ System Manager

The Threat Engine™ system Manager 502 is responsible for managing the individual instances of Threat Engine™s (along with associated components for doing input data stream transformation/output data stream transformation) in the system 100. As part of this functionality, the Threat Engine™ Manager 502 manages the load between the servers allocated to input data processing, output data processing and classification. The Threat Engine™ Manager 502 generates three main types of data:—

Performance data 508 (e.g. the data throughput, the current system load, statistics about how each individual Threat Engine™ is performing). This is passed to the Reporting Manager 506.

Data Exception information 510 (e.g. input data validation found data outside of know limits). This is passed to the Reporting Manager 506.

Classification data 514. This is passed to the Decision Manager for further processing.

Decision Manager

The decision manager 504 takes the output data streams 514 from each of the individual Threat Engine™ under control of the Threat Engine™ Manager 502 and along with the relevant context information collates this information to generate threats 516.

Reporting Manager

The Reporting Manager 506 is used to collate information from the Threat Engine™ Manager 502 and the Decision Manager 504, and to report this to the outside world. As such it acts as the main interface into other systems. As well as notifying other systems, the Reporting Manager 506 can also be configured to generate notifications by email, SMS, etc. Typically, threat information would be passed to the overall command and control system, whereas performance information (for example, unusually high processing load information) would be notified directly by the Reporting Manager 506.

To allow all this information to be handled efficiently, the Reporting Manager 506 allows different information types to be combined into user-defined information categories. For each information category, the system 100 can be configured as to what action to take. The information categories can be arranged into a hierarchical structure such that one category can be derived from a second category, and where this is done, the child category inherits all of its parents properties/actions (for example we could define an information profile Threat and derive a second profile Biological Threat from this).

In addition to all the above functionality, the Reporting Manager 506 provides allows pre-defined/user-configurable reports to be viewed remotely via a web interface.

Distributed Architecture

The Threat Engine™ system 100 has been developed such that it can be deployed onto a single server, or to be distributed across a number of different servers. The system deployment options chosen is based upon a number of factors such as classification data throughput, the input and output data transformation requirements, and the nature of the overall system into which the Threat Engine™ system 100 is being integrated.

Messaging services are employed between the different nodes in the system 100 to maximise the data throughput through the system. In addition where multiple processing servers are utilised, fault tolerance is provided as the system automatically balances the throughput through the available servers. Similarly, functionality is also provided to allow servers to be taken offline providing a mechanism for routine server maintenance, upgrades, etc.

Extendable Framework

The individual building blocks of the Threat Engine system 100 have well defined object models allowing the standard functionality to be extended by third parties if required using the functionality provided by the Microsoft.NET Framework (version 2) for example. In addition to this, the system architecture is such that third party modules can be engineered as part of the system 100 without having to make any changes to the standard functionality. For example a data transformation component for converting an input data stream from a proprietary format into a data stream capable of being classified, could be authored by a third party software house and plugged into the Threat Engine™ system framework (this allows for situations such as non-standard input data formats, specific data encryption on the input data stream, etc. to be handled with no changes to the Threat Engine™ system 100, and without having to disclose any details of the input data format).

System Properties

An embodiment of the Threat Engine™ system 100 has several features that are substantial improvements on intelligent computer systems that are presently available or expected to become available in the near future. The main features of this embodiment of the system 100 are known to be the best possible way of analyzing the data. That is, the main parts of the system 100 can be proved to be optimal according to multiple criteria such as mini max, least squares and minimum entropy.

The system 100 can analyze data from a large number of applications. Data from a particular application are presented to the system 100 without any pre-processing. The source of data is irrelevant, provided that it conforms to some minimum requirements. It should be coded as a real set of numbers, integers or binary digits. An additional requirement is that the data should contain several parameters for each individual condition or event. This statement is equivalent to saying that the data should contain sufficient complexity for the meta-pattern recognition approach to be useful.

The system 100 automatically pre-processes the input data in an optimal way. The data retains all its important properties but little unwanted noise. This pre-processing achieves an optimal dimensionality reduction.

The system 100 finds and analyzes the best possible set of rules for classification and prediction. It does this using the properties of the input data. Human input is not required. Having determined the most appropriate method, the system 100 restructures its internal organization to reduce the amount of computation necessary.

Several levels of learning are incorporated as an integral part of the system 100.

In effect, any functional part of the meta-pattern recognition system is part of a learning algorithm e.g. the part of the algorithm for the initial evaluation of the input data is also part of several learning mechanisms. These learning mechanisms adjust their function so as to maximize overall performance.

The Configuration Database

Figure 6:
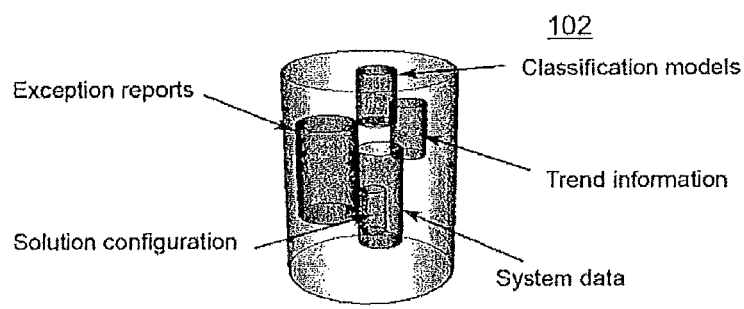
FIG. 6 is a schematic illustration of a configuration database component for a threat engine system.

The configuration database is schematically illustrated in FIG. 6 and is the repository responsible for maintaining the information required by the different parts of the Threat Engine™ system 100. This repository contains a wide variety of information; —

(1) Data validation information, including data limits, trend information and validation classifier model information.

(2) Solution Configuration Information. A stand alone variant of the Threat Engine™ system 100 is effectively defined by a particular set of configuration information. This information includes; —
 (a) A list of the classifiers
 (b) How the classifier results should be combined
 (c) Version information
 (d) Context information for classification and exception reporting.

(3) Classifier model information. Each of the classifiers in the classifier bank, is implemented around a standardized structure. The classifiers consist of two parts, a classifier model and a classification engine. The model contains all the configuration information required to make the particular classification engine work.

(4) system data, information about the resources available to the current system.

(5) Reports, a history of all the reports, exception reports and threat reports is maintained by the system. These can automatically be exported from the system in XML format.

Embodiments in accordance with the present invention may be implemented in many ways according to manufacturing, implementation and/or use convenience. For example, the Threat Engine™ system 100 may be implemented using conventional electronic circuits such as integrated circuits to form a new electronic apparatus which implements the Threat Engine™ system 100. The new electronic apparatus may comprise electronic devices such as gate-arrays which are electronically configured to perform particular electronic functions. Further, the electronic apparatus may include configurable processor units such as Programmable Intelligent Computers (PIC) supplied by Microchip Technology, for example the 1640 PIC, which are configured in accordance with a series of electronic signals comprising instructions, parameters and data (generally referred to as program elements of a computer program) for configuring the PIC. The PIC may be electrically connected to other electronic circuits in the electronic apparatus, and the program elements may be supplied from a store for electronic signals such as Read Only Memory (ROM), Random Access Memory (RAM) or other store of electronic signals.

New apparatus may also be implemented by configuring a general purpose data-processing apparatus, such as a microprocessor in a computer system. By way of appropriate electrical signals (computer program elements) supplied to the microprocessor, the microprocessor may be configured to perform new functions and thereby comprise a new apparatus. The configuration of the microprocessor need not be fixed at any particular time to meet the overall function of the Threat Engine™ system 100 for example, but be configured to implement those aspects of the Threat Engine™ system 100 necessary at a particular time.

With the foregoing in mind, embodiments of aspects of the Threat Engine™ system 100 will now be described implemented by appropriately configured general purpose data processing apparatus.

Figure 7:
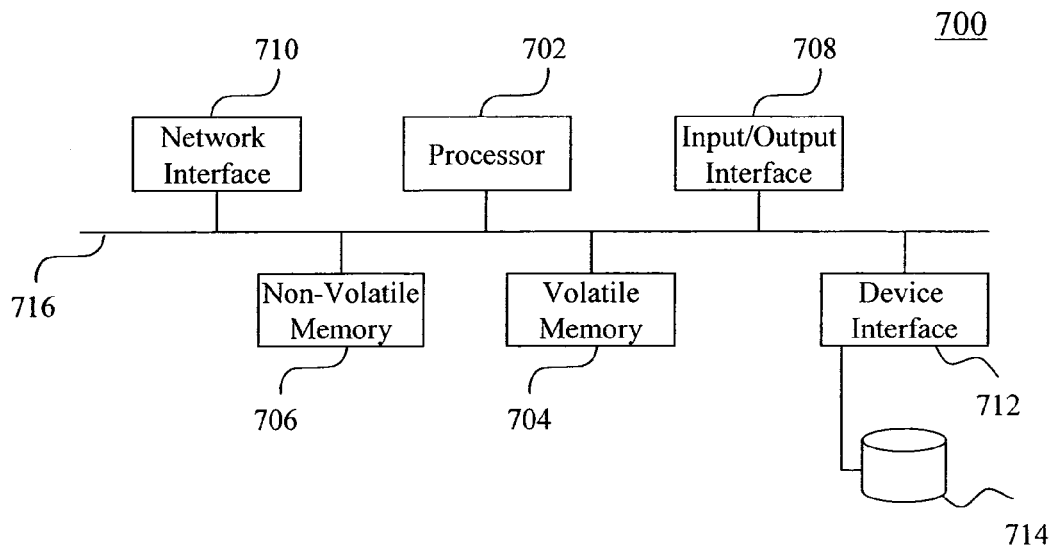
FIG. 7 is a schematic illustration of data processing apparatus within a computer system.
Figure 8:
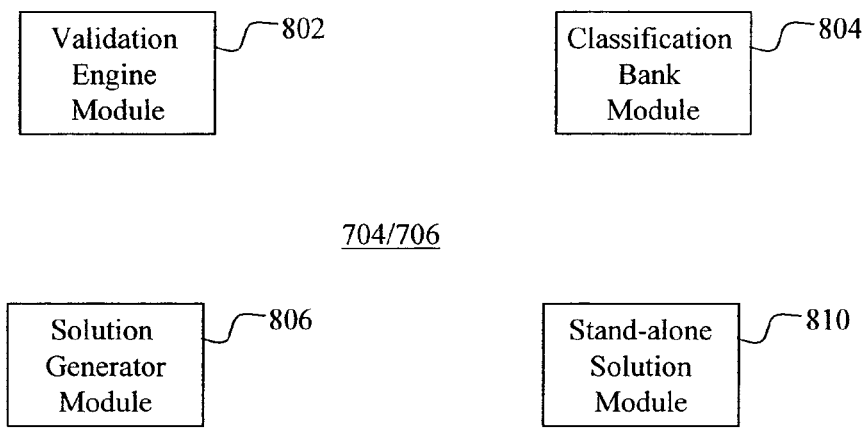
FIG. 8 is a schematic illustration of the software modules in accordance with an embodiment of the invention.

Referring now to FIG. 7, a computer system 700 is schematically illustrated. The computer system 700 includes a processor 702 which executes computer program instructions supplied to it, for example from an instruction store such as volatile memory 704 or non-volatile memory 706. The volatile memory 704, as well as storing program instructions, may also provide a temporary store for data, parameters and results of instructions executed by processor 702. Non-volatile memory 706 typically stores basic operating system data and instructions for processor 702.

Computer system 700 also includes an input/output interface 708 through which data may be input to the computer system, for example by way of a keyboard, keypad or some other user interface device. Additionally, the computer system 700 includes a network interface 710 which is configured to provide communication to computer networks such as local area networks (LAN), wireless LANs, public subscriber telephone networks (PSTN), wide area networks such as the Internet and other communications networks. A device interface module 712 provides communication to peripheral devices such as high-volume storage devices 714, printers and other such peripheral devices.

The elements of the computer system 700 are coupled to a common communications mechanism 716, generally known as a "bus". The bus provides a communications conduit for transferring instructions and data between elements of the computer system 700, and for accessing a particular element (the address bus).

In the described embodiment, each component of the Threat Engine™ system 100 is primarily configured as a computer program module having instructions, parameters and data which when executed by processor 702 implement the functionality of that component of the Threat Engine™ system 100. The validation engine module 802, classification bank module 804, solution and generator module 806 and standalone solution module 810 may be stored in one or other of volatile memory 704 and non-volatile memory 706 or distributed between them. Optionally, one or more of the Threat Engine™ system 100, or program elements of such components, may be stored in a high-volume storage device 714 and downloaded to volatile memory 704 when the data processing apparatus is to be configured as the Threat Engine™ system 100.

As described in general overview, the validation engine module 802 may provide data corrected for exceptions and the like to the rest of the Threat Engine™ system 100. No further description of the operation of the validation engine module 802 will be provided since its validation functions may be implemented by conventional processes. Furthermore, it is possible for the Threat Engine™ system 100 to be operated without the data going through the validation engine.

A general description of the approach behind embodiments of the present invention implementing selection of classifier modules using multiple regression will now be described.

As will be well-known to those of ordinary skill in the art classifiers in pattern recognition are methods for separating data into two or more subgroups. Traditionally, the choice of a classifier for a particular problem has been made on the basis of trial and error.

Embodiments in accordance with an aspect of the present invention may be viewed as examples of a meta-pattern recognition engine.

The output from a set of classifiers is itself a multivariate data set, which may be thought of as defining a classification space. In embodiments of the present invention such a space may be used to form the basis of a selection mechanism, since the classifiers are designed such that the outputs are comparable, and class affiliation estimates, ranging between 0 and 1 e.g. in the two class case the classifiers outputs would be a two element vector.

The formation of a classification space bestows a number of benefits, not least the ability to compare classifiers implemented at different dimensionalities.

More formally a classification space, 'S', is formed by applying a bank of, 'n', classifiers, 'C', to an input data set 'X'.

$$S = C(X)$$

where $$S_i = C_1(X_i), C_2(X_i), \ldots, C_n(X_i)$$

Where $S_i$ denotes the ith row of matrix C, and Ci, denotes the ith classifier in the classifier bank.

Once such a classification space has been formed, selection of a subset of classifiers which optimally represents the information in this space is used to provide a solution to the problem of classifier selection. For the classification data being formed from training data, i.e. a data set for which the class affiliation of the elements is known, the class affiliation vector, $T_i$, may be incorporated form an enhanced classification space.

$$S_i^e = C_1(X_i), C_2(X_i), \ldots, C_n(X_i), T_i$$

'$T_i$', denotes the 'true' class affiliation information, e.g. in a two class case $T_i = [1, 0]$ would indicate that the i th training sample belonged to the first of the two potential classes, $T_i = [0, 1]$ would indicate the sample belonged to the second class. The enhanced classification space then contains the relationships between the classifier outputs and the classification conditions.

This enhanced classification space may be used to derive a simple measure indicating the adequacy of the input data for the accurate classification. An optimal subset of classifiers can be derived from the enhanced classification space. This optimal subset may be formed for the classification results in the same way as for any other multivariate data set. If an element(s) of the class affiliation vector were chosen to member of this subset, this would indicate that a portion of the class affiliation variance is orthogonal to the classifier outputs. This would suggest that additional information was required for accurate classification.

The optimal subset formed in enhanced classification space selects classifiers which are important for representing the output from all the classifiers used. If the majority of classifiers perform poorly, then the contribution of more appropriate classifiers could be swamped by the 'noise' from a large number of inaccurate classifiers. In short, the representational requirements for the reduction of noise in the enhanced classification space differ from those of the initial descriptor space. In the classification space the criterion for information redundancy is determined relative to the class affiliation information. The representations required are class related as opposed to the purely representational requirements of the initial descriptor space.

The class affiliation vector in enhanced classification space is a low dimensional object in a multidimensional space. Redundancy within this enhanced classification space may be reduced by the removal of classifiers effectively uncorrelated with the class affiliation vector. This is achieved by obtaining the set of classifiers which gives the maximum multiple correlation coefficient between the selected set of classifiers and the class affiliation vector. A search is used to obtain the classifier subset over a particular range of dimensionalities. The search may be exhaustive or utilise one of the well known search methodologies such as "branch and bound" [2].

This multiple regression can be performed to minimize the regression coefficients based on, $$T=C(X)\beta$$

where, 'T' is the class affiliation matrix i.e. '$T_i$', the i th row of T is class affiliation vector for the i th example e.g. for a three class case $T_i$ will be [1 0 0], [0 1 0] or [0 0 1]. Hence, assuming three classes, and 300 training samples per class, T would be a 900×3 matrix. Further, if assume the number of classifiers, 'p', to be 20, then C(X) would be 900×60 matrix (60=20×3).

Optionally, the problem may be reduced to a series of class dependent regression formulations, for the case where we have 'k' classes, $$T_1 = C_1(X)\beta_1$$
$$T_2 = C_2(X)\beta_2$$
$$\vdots$$
$$T_k = C_k(X)\beta_k$$

In this case '$T_i$', contains a single class affiliation value for the i th class. Using similar figures to the previous example, Ti would be a 900 element vector, $C_i(X)$, is 900×20 matrix.

In the described embodiment the data input to the classifier banks comprises feature data representative of the input data set. This is the case whether training data or real data is being used. The feature data is obtained by performing feature selection and extraction on the initial source data elements.

For the described embodiment the initial data, whether training data or real data (i.e. data obtained during run-time operation of the Threat Engine™ system 100) comprises the energy spectra for three radioactive materials, americium, caesium and cobalt.

The initial data is sometimes termed initial descriptor data, and this term shall be used in the following description. In the described embodiment the initial descriptor data, $X_{i,j}$, comprises 300 examples of training data for each class. That is to say, 300 energy spectra for each of americium, caesium and cobalt sample materials. The energy spectra are divided into 512 energy bins, thus the initial descriptor vectors have 512 elements. In this case $X_{i,j}$ denotes the i, $j^{th}$ element of 900×512 matrix i.e. each row in the X matrix, i.e. $X_i$, represents a separate measurement instance of 'n', 512, descriptor responses. That, each row in the X matrix represents a energy separate spectrum.

A subset of the initial descriptor data is formed using a two stage approach based around the discrete Karhunen Loève (KL) expansion, [3]. An initial feature selection is performed using a non-exhaustive forward selection algorithm. This entails obtaining and ordering the Karhunen Loève coordinate axes, and then selecting the descriptor variables in turn, without replacement, which explains the maximum variance of each KL axis.

The descriptor vector, $X_i$, is expanded as a linear combination of orthogonal basis vectors, $$X_i = \sum_{j=1}^{n} \alpha_{i,j} \Phi_j$$

In the case of the principal component analysis the basis vectors are defined to be orthogonal i.e.

$$\Phi_j^t \Phi_j = 1$$

Where 't', denotes transposition. These vectors form the basis of a linear mapping from the descriptor space to another orthogonal space. The coefficients of the expansion, $\alpha_{i,j}$, are the coordinates of the new space.

If the basis vectors are chosen to be the eigenvectors of the sample covariance matrix (or correlation matrix) then the resultant expansion is termed the Karhunen Loève expansion i.e. $R_0$ denotes the sample covariance matrix, $$R_0 = E[(X_i-\mu)(X_i-\mu)^t]$$

the basis vectors, $\Phi_j$ are given by, $$\Phi^t R_0 \Phi = \lambda$$

Where $\lambda$ is a diagonal matrix, which contains the eigenvalues of the sample covariance matrix. These eigenvalues indicate the amount of variance represented by each of the axes in the new coordinate system.

The pooled covariance matrix, or pooled correlation matrix, may also be used as the basis for the expansion. The pooled covariance matrix is defined, $$R_p = \sum_{i=1}^{m} p(\omega_i) E[(X_i - \mu)(X_i - \mu)^t]$$

where, E[ ], denotes the expectation operator, 'm', is the number of pattern classes, $p(\omega_i)$ is the apriori probability of the pattern class $\omega_i$ occurring. If the apriori probabilities are unknown then $p(\omega_i)$ may be set to 1/m. If this is done then the pooled covariance matrix corresponds to the sample covariance matrix.

This set of basis vectors is truncated on the basis of some predetermined threshold to a smaller set containing di elements. This threshold is usually chosen on the basis of the percentage of the total descriptor variance which the selected eigenvector set explains, although other criteria have been suggested; see Eastman and Krzanowski (1982) [4]. The descriptors at each position in respective rows of matrix X corresponding to the position of the largest element by magnitude in the eigenvector associated with the largest eigenvalue are selected without replacement. Then the descriptors at the row position in X associated with the largest entry in the eigenvector associated with the second largest eigenvalue is chosen without replacement. This process continues until di descriptors are selected, to form a reduced descriptor set, $\hat{X}$ i.e. given the example above, $\hat{X}$ would be a 900xdi matrix.

Having performed this descriptor selection, the reduced set of descriptors may now be further reduced in dimensionality by the formation of second Karhunen Loève expansion based on the reduced descriptor set, $\hat{X}$.

The second Karhunen Loève expansion gives the set of training feature data that is input to the template classifier bank for the first stage of optimising the classification, or provides the actual feature data input to the first optimised classifier bank in the stand-alone solution 110.

Embodiments of the invention implementing a classification selection approach as outlined above will now be described. In the described embodiment the Threat Engine™ system 100 may be operated in two modes. The first mode is a training mode, and is used to generate automatically an optimised configuration of the classifier bank 106 for the data input during the training mode. The second mode is a run-time mode, wherein the classifier bank 106 is arranged in its optimal configuration derived during the training mode for the environment in which the Threat Engine™ system 100 is running.

Operation of the Threat Engine™ system 100 in the training mode will now be described. The training mode is primarily controlled by the solution generator module 806, and the main stages of the training mode implemented by solution generator module 806 are illustrated in the process control flow diagram of FIG. 9.

Figure 10:
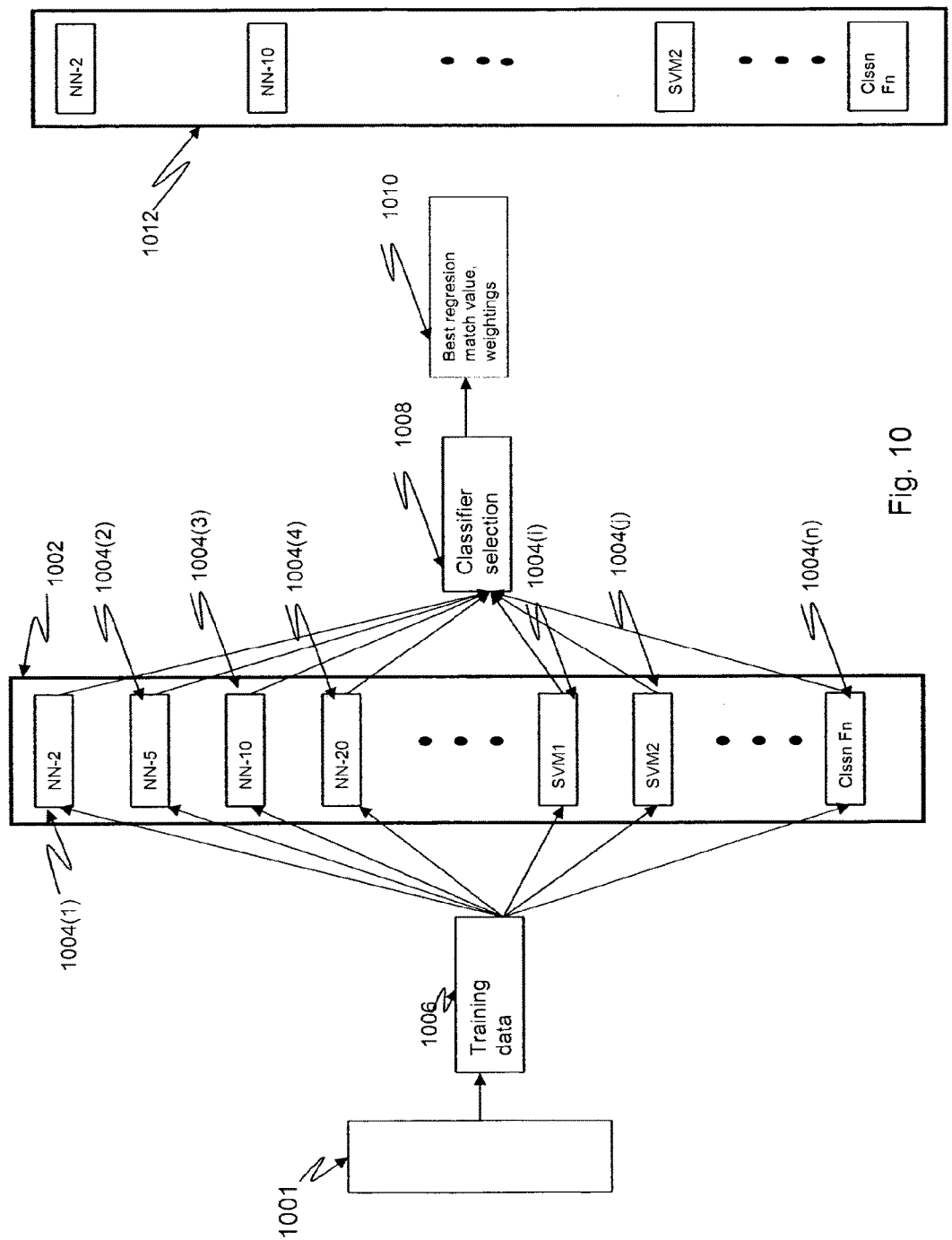
FIG. 10 is a block diagram illustrating the generation of a classifier bank from a template classifier bank in accordance with an embodiment of the present invention.

The operation of solution generator module starts at step 902 by instantiating a template classifier bank 1002, schematically illustrated in FIG. 10. The template classifier bank 1002 includes n classifier modules 1004(1) to 1004(n). Each classifier module 1004 may implement a conventional classification process or routine. For example, classification module 1004(1) implements a nearest neighbour routine based on two nearest neighbours, module 1004(2) is based on five nearest neighbours, module 1004(3) is based on 10 nearest neighbours and 1004(4) is based on 20 nearest neighbours. As will be readily appreciated by a person of ordinary skill in the art, the number of nearest neighbours described in the foregoing are by way of example and illustration only, and embodiments in accordance with the present invention may be implemented based on different numbers of nearest neighbours. Furthermore, embodiments of the present invention are not limited to particular nearest neighbour routines but any suitable routines may be implemented, for example the nearest neighbour routines may comprise one or more of the following non-limiting list: Linear scan; Kd-trees; Balltrees; Metric trees; Locality sensitive hashing (LSH); and Agglomerative-Nearest-Neighbour.

Another example of a classification module is a support vector machine such as represented by classification modules 1004(i) and 1004(j) in FIG. 10. Any suitable classification function may be used for a classification module such as is represented by classification module 1004(n).

Template classifier bank 1002 is configured with a number of classification modules 1004 that an implementor of the invention considers appropriate to provide sufficient classification of the data intended to be classified. However, it may be an advantage of an embodiment of the present invention that there is no limit on the number of classification modules that may be included, at least in so far as there being an adverse impact on classification accuracy due to a large number of classification modules. This is because the present invention selects the combination of classifiers from the template classifier bank that provide the best or optimum classification for a given training data set.

Figure 9:
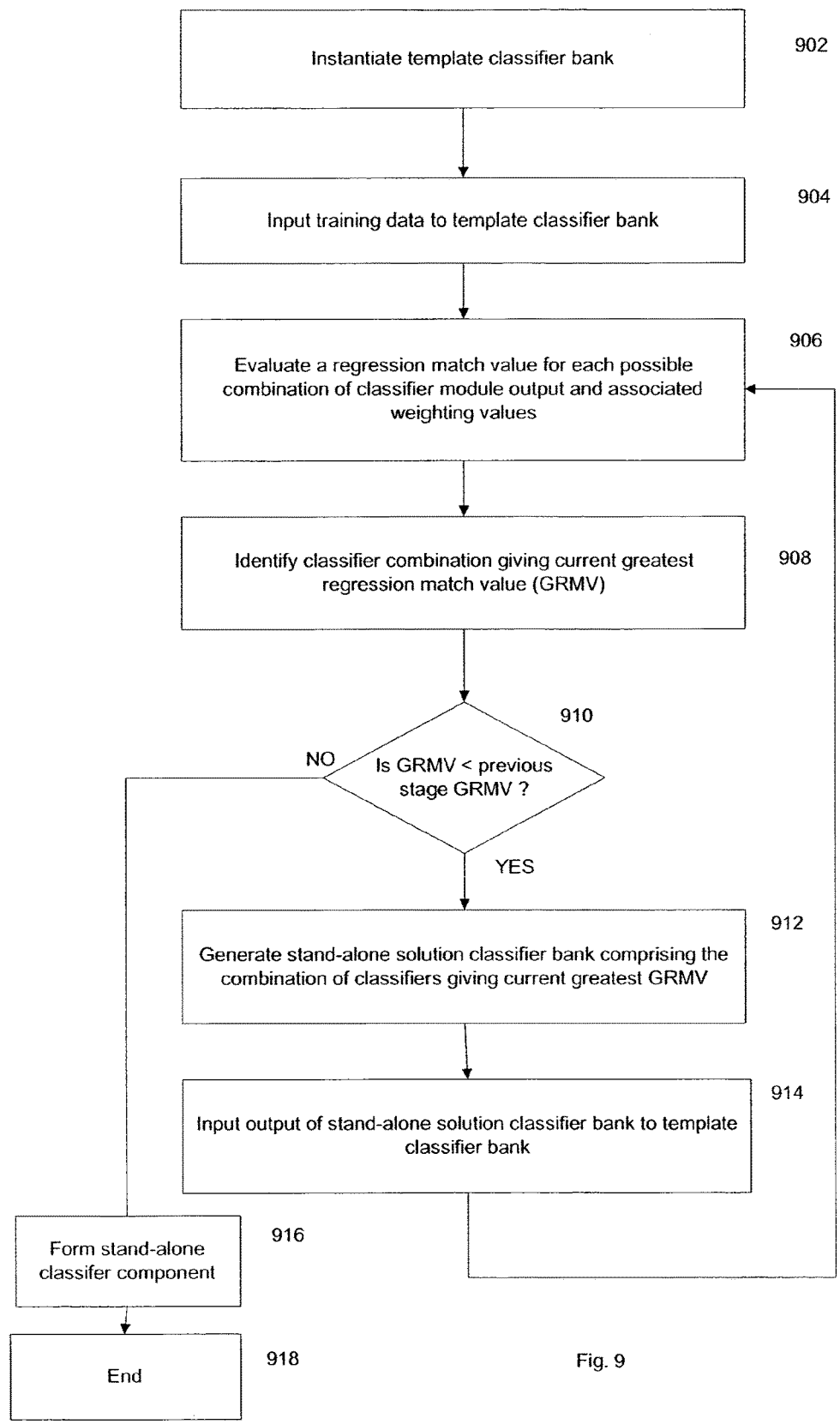
FIG. 9 is a process control flow diagram for data processing apparatus configured in accordance with an embodiment of the present invention.

Once the template classifier bank has been instantiated process control flows to step 904 of the flowchart illustrated in FIG. 9, where the solution generator inputs training data 1006 to the template classifier bank 1002. Each element of the training data is input to each classification module 1004 of the template classifier bank 1002 as schematically illustrated in FIG. 10. The training data 1002 is a feature set of the original data from the second Karhunen Loève expansion undertaken in feature selection and extraction module 1001.

In the described embodiment training data 1006 comprises data elements which are representative of a large number of source data elements, the data elements of the training data are typically referred to in the classification art as "features". This is because they are representative of characteristic features of the original source data. In the example embodiment, the source data is representative of the spectrum obtained from three radioactive materials, namely americium (Am), caesium (Cs) and cobalt (Co), and the training data is likewise representative of those three radioactive materials. Thus, in the described embodiment there are three classes into which the data is to be classified. Training data may be derived from a "live" training environment in which sensors collect signals from the three radioactive materials and provide sensor data to the Threat Engine™ system 100. Optionally, the training data may be supplied from a store of pre-collected sensor data or the training data may be based upon synthesised data.

Each feature data of the training data 1006 is identified as representing a feature of one of the spectrum of americium, caesium and cobalt. For example, the data input to the template classifier bank 1002 may comprise a feature value (fv) and an indication (Is) of which radioactive material that feature is representative and may be algebraically represented as: (fv; Is).

The output of each classifier module 1004 is an array of three values, each value representing an estimate of the likelihood of a feature being within a particular class of material, i.e. representative of one of americium, caesium and cobalt. The output values may be described as class affiliation estimate values, and typically represent a probability value between zero and one.

Process control then flows to step 906 of the process control flow diagram of FIG. 9 where linear multiple regression is applied to each possible combination of output from classifiers 1004 in order to evaluate a regression match value 1010 indicating which combination of classifier outputs provides the closest match to each class. Referring to FIG. 10, the linear multiple regression analysis is part of the classifier selection element 1008. The linear multiple regression analysis also indicates the weighting applied to each classifier output value. The classifier module combination providing the greatest regression match value, 1010, is identified, step 908, and if the regression match value is greater than a previous match value, step 910, the solution generator module then generates, step 912, a stand-alone solution classifier bank 1012 comprising a combination of the classifiers which gave the greatest regression match value. For a first pass, there is no previous regression match value and so stand-alone solution classifier bank 1012 is always generated. The stand-alone solution classifier bank 1012 is schematically illustrated in FIG. 10. Thus, an optimal classifier bank is generated automatically from the large number of classifier modules 1004 in the template classifier bank 1002.

Steps 906 to 912 are represented in the block diagram of FIG. 10 as classifier selector 1008.

In order to further optimise the standalone classification bank 1012, operation of solution generator module 108 moves to step 914 of the process control flow diagram illustrated in FIG. 9 where the classifier output values of the combination of classifier modules 1004 giving the greatest regression match value 1010 are input to the standalone solution classifier bank 1012.

Figure 11:
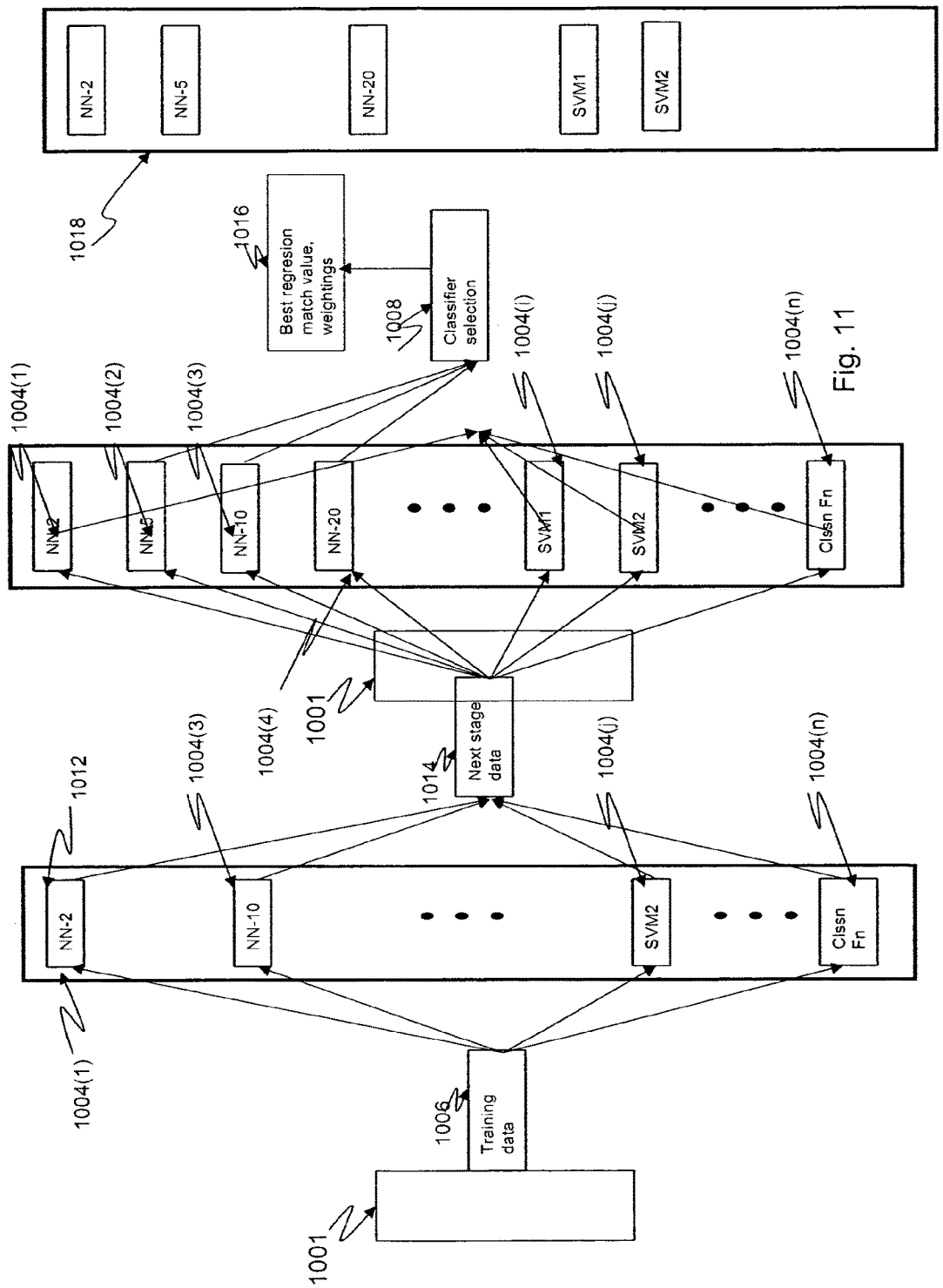
FIG. 11 is a block diagram illustrating the generation of a further resultant classifier bank from a template classifier bank in accordance with an embodiment of the present invention.

This may be considered as illustrated in FIG. 11, where the stand-alone solution classifier bank 1012 has training data 1006 input to it, and the outputs of stand-alone solution classifier bank 1012 form the next stage data 1014. The next stage data is input to feature selection and extraction module 1001, and the feature data representative of the next stage data is input to all the classifier modules 1004 of the template classifier bank 1002.

Process control for the solution generator 108 then flows to back to step 906 where linear multiple regression is applied to each combination of the outputs of template classifier bank 1002, and the combination giving the greatest next stage regression match value 1016 for the next stage classification is identified, step 908. The next stage greatest regression match value 1016 is compared with the previous stage greatest regression match value and if it is greater the process control flows to step 912, otherwise the solution generator process flows to step 918. The classifier selection for the next stage is illustrated as element 1008 in FIG. 11.

At step 912 the solution generator module 108 generates a next stand-alone solution classifier bank 1018 comprising a combination of the classifiers 1004 which gave the next stage greatest regression match value 1016. The next stand-alone solution classifier bank 1018 is illustrated in FIG. 11.

Figure 12:
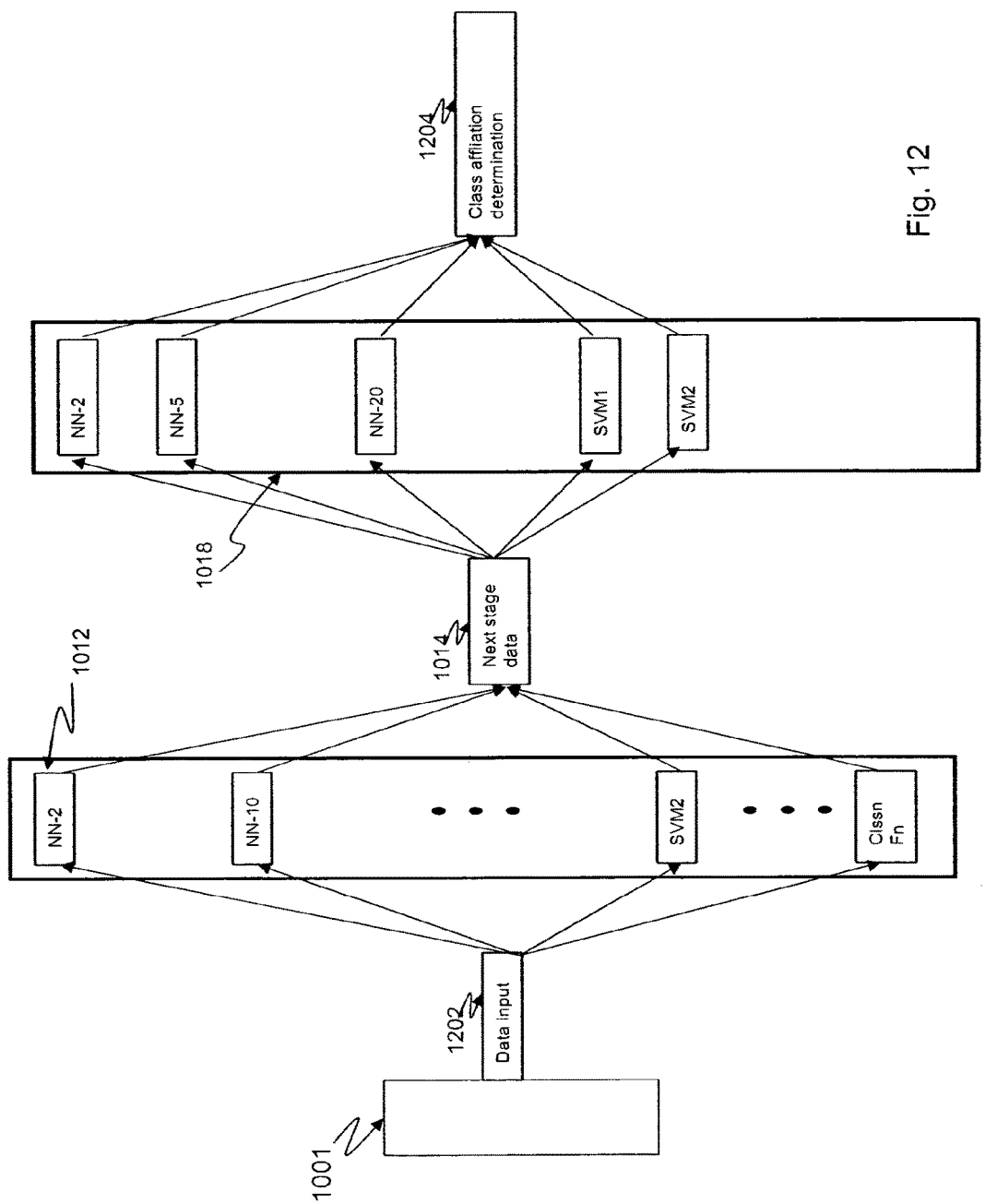
FIG. 12 is a block diagram illustrating an automatically generated classification component in accordance with an embodiment of the present invention.

At step 918 stand-alone solution generator 108 forms a stand-alone solution module comprising a combination of the stand-alone solution classifier banks 1012 and 1018. The architecture for the stand-alone solution module is schematically illustrated in FIG. 12.

The first derived classifier bank 1012 is arranged to receive feature data 1202 representative of sensor data from americium, caesium and cobalt sensors. The output from classifier bank 1012 forms the data input 1014 for the next classifier stage and is input to the next derived classifier bank 1018. The output from classifier bank 1018 is then input to a class affiliation determination module which gives a final class affiliation value based on the regression match value derived from the output of classifier bank 1018.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

In view of the foregoing description it will be evident to a person skilled in the art that various modifications may be made within the scope of the invention. For example, although embodiments of the invention have been described with reference to a reduced set of data known as a feature data set, it would be evident to a person of ordinary skill in the art that the complete set of raw data may be input to the classifier banks. Furthermore, the described examples are based on data from three different radioactive materials which gives rise to a three class classification system. However, it will be evident to a person of ordinary skill in the art that is there may be more or less than three types of radioactive material, and therefore more less than three types of classification. Moreover, the data is not limited to the representative of radioactive material and Eddie Spectra, but may be representative of any other sense material, which in the particular application would represent a security threat. However, applications the present invention are not limited to homeland security, but the classification bank optimisation and feature selection and extraction may be utilised for classifying data representative of other things.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

REFERENCES

[1] B. Batchelor (1978), Pattern Recognition: Ideas in Practice, Plenum Press, London.
[2] E. M. L. BEALE, M. G. KENDALL AND D. W. MANN, "The discarding of variables in multivariate analysis", Biometrika (1967), 54, 3 and 4, p. 357.
[3] S. Watenabe (1964), Karhunen Loève expansion and Factor Analysis—Theoretical remarks and applications, Proc. 4$^{th}$ Prague Conf. on Information Theory.
[4] H. T. Eastman and W. J. Krzanowski (1982), Cross validitory choice of the number of components from principal component analysis, Technometrics, Vol 24, pp 73.

The invention claimed is:

1. A detection system configured to identify a class of radioactive material based upon detected radiation emitted from a radiation source, the detection system comprising a processor and software configured to:
   (a) provide a template classifier bank comprising a plurality of classifier modules, each classifier module operative to receive training data comprising data elements, the data elements representative of an energy spectrum of radiation emitted from two or more classes of radioactive material and the data elements obtained from sensors operative to measure an energy spectrum of radiation emitted from two or more classes of radioactive material, and to output a class affiliation estimate value for each input data element, each class affiliation estimate value representative of an estimate of the likelihood of a data element being within a particular class of the two or more classes of radioactive material;
   (b) derive a combination of the class affiliation estimate values providing a highest correlation to the two or more classes of radioactive material;
   (c) generate a classification component formed of a resultant classifier bank comprising a combination of the plurality of classifier modules corresponding to the combination of class affiliation estimate values providing the highest correlation to the two or more classes of radioactive material;
   (d) provide an output from the resultant classifier bank to a class affiliation determination module; and
   (e) generate a final class affiliation value in the class affiliation determination module based upon a regression match value derived from the output of classifier bank so as to identify the class of radioactive material.

2. The detection system according to claim 1, wherein the resultant classifier bank comprises a sub-set of the plurality of classifier modules forming the template classifier bank.

3. The detection system according to claim 2, further configured to deselect classifier modules from the template classifier bank to generate the resultant classifier bank.

4. The detection system according to claim 2, further configured to apply a zero weighting to outputs of the template classifier bank not corresponding to the combination of estimate values providing the highest correlation to the two or more classes of radioactive material.

5. The detection system according to claim 1, further configured such that the combination of class affiliation estimate values provides respective highest correlation values to the two or more classes of radioactive material, and to generate the resultant classifier bank comprising a combination of the plurality of classifier modules corresponding to the combination of class affiliation estimate values providing the respective highest correlation values.

6. The detection system according to claim 1, further configured such that the highest correlation is represented by a highest correlation value derived from a mathematical combination of the class affiliation estimate values, and the resultant classifier bank comprises a combination of the plurality of classifier modules corresponding to the combination of class affiliation estimate values providing the highest correlation value.

7. The detection system according to claim 6, wherein the mathematical combination comprises a mean value of the class affiliation estimate values.

8. The detection system according to claim 1, further configured to analyze the class affiliation estimate values using regression analysis in order to derive the combination of class affiliation estimate values.

9. The detection system according to claim 1, further configured to input the class affiliation estimate values whose combination provided the respective highest correlation to each of the plurality of classifier modules of the template classifier bank to obtain further class affiliation estimate values and to derive a combination thereof which provides a further highest correlation to the two or more classes of radioactive material, and to generate a multi-stage classification component formed of the resultant classifier bank and a further resultant classifier bank comprising a combination of the plurality of classifier modules corresponding to the combination of further class affiliation estimate values providing the further highest correlation for the further highest correlation being greater than the highest correlation, and to arrange the multi-stage classification component such that class affiliation estimate values output from classifier modules of the resultant classifier bank are input to classifier modules of the further resultant classifier bank.

10. The detection system according to claim 9, wherein the further resultant classifier bank comprises a sub-set of the plurality of classifier modules forming the template classifier bank.

11. The detection system apparatus according to claim 10, further configured to deselect classifier modules from the template classifier bank not corresponding to the combination of estimate values providing the highest correlation to generate the further resultant classifier bank.

12. The detection system according to claim 10, further configured to apply a zero weighting to outputs of the template classifier bank not corresponding to the combination of estimate values providing the highest correlation to the two or more classes of radioactive material to generate the further resultant classifier bank.

13. The detection system according to claim 9, further configured such that the combination of further class affiliation estimate values provides respective highest correlation values to the two or more classes of radioactive material, and to generate the further resultant classifier bank comprising a combination of the plurality of classifier modules corresponding to the combination of further class affiliation estimate values providing the respective highest correlation values.

14. The detection system according to claim 9, further configured such that the highest correlation is represented by a highest correlation value derived from a mathematical combination of the further class affiliation estimate values, and the further resultant classifier bank comprises a combination of the plurality of classifier modules corresponding to the combination of further class affiliation estimate values providing the highest correlation value.

15. The detection system according to claim 14, wherein the mathematical combination comprises a mean value of the further class affiliation estimate values.

16. The detection system according to claim 9, further configured to analyse the further class affiliation estimate values using regression analysis in order to derive the combination of further class affiliation estimate values.

17. The detection system according to claim 1, further configured to normalize the training data.

18. A method of operating a detection system having a processor and software to identify a class of radioactive material based upon detected radiation emitted from a radiation source, the method comprising:
  (a) providing a template classifier bank comprising a plurality of classifier modules, each classifier module operative to receive training data comprising data elements, the data elements representative of an energy spectrum of radiation emitted from two or more known classes of radioactive material and the data elements obtained from sensors operative to measure an energy spectrum of radiation emitted from two or more classes of radioactive material, and to output a class affiliation estimate value for each input data element, each class affiliation estimate value representative of an estimate of the likelihood of a data element being within a particular class of the two or more classes of radioactive material;
  (b) deriving a combination of the class affiliation estimate values providing a highest correlation to each of the two or more classes of radioactive material;
  (c) generating a classification component formed of a resultant classifier bank comprising a combination of the plurality of classifier modules corresponding to the combination of class affiliation estimate values providing the highest correlation to the two or more known classes of radioactive material;
  (d) providing an output from the resultant classifier bank to a class affiliation determination module; and
  (e) generating a final class affiliation value in the class affiliation determination module based upon a regression match value derived from the output of classifier bank so as to identify the class of radioactive material.

19. The method according to claim 18, wherein the resultant classifier bank comprises a sub-set of the plurality of classifier modules forming the template classifier bank.

20. The method according to claim 19, further comprising deselecting classifier modules from the template classifier bank to generate the resultant classifier bank.

21. The method according to claim 19, further comprising applying a zero weighting to outputs of the template classifier bank not corresponding to the combination of estimate values providing the highest correlation to the two or more classes of radioactive material.

22. The method according to claim 18, wherein the combination of class affiliation estimate values provides respective highest correlation values to the two or more classes of radioactive material, and further comprising generating the resultant classifier bank comprising a combination of the plurality of classifier modules corresponding to the combination of class affiliation estimate values providing the respective highest correlation values.

23. The method according to claim 18, wherein the highest correlation is represented by a highest correlation value derived from a mathematical combination of the class affiliation estimate values, and the resultant classifier bank comprises a combination of the plurality of classifier modules corresponding to the combination of class affiliation estimate values providing the highest correlation value.

24. The method according to claim 23, wherein the mathematical combination comprises a mean value of the class affiliation estimate values.

25. The method according to claim 18, further comprising analyzing the class affiliation estimate values using regression analysis in order to derive the combination of class affiliation estimate values.

26. The method according to claim 18, further comprising inputting the class affiliation estimate values whose combination provide the respective highest correlation to each of the plurality of classifier modules of the template classifier bank to obtain further class affiliation estimate values, deriving a combination thereof which provides a further highest correlation to the two or more classes of radioactive material, generating a multi-stage classification component formed of the resultant classifier bank and a further resultant classifier bank comprising a combination of the plurality of classifier modules corresponding to the combination of further class affiliation estimate values providing the further highest correlation for the further highest correlation being greater than the highest correlation, and arranging the multi-stage classification component such that class affiliation estimate values output from classifier modules of the resultant classifier bank are input to classifier modules of the further resultant classifier bank.

27. The method according to claim 26, wherein the further resultant classifier bank comprises a sub-set of the plurality of classifier modules forming the template classifier bank.

28. The method according to claim 27, further comprising deselecting classifier modules from the template classifier bank not corresponding to the combination of estimate values providing the highest correlation to generate the further resultant classifier bank.

29. The method according to claim 27, further comprising applying a zero weighting to outputs of the template classifier bank not corresponding to the combination of estimate values providing the highest correlation to the two or more classes of radioactive material to generate the further resultant classifier bank.

30. The method according to claim 26, wherein the combination of further class affiliation estimate values provides respective highest correlation values to the two or more known class affiliations, and further comprising generating the further resultant classifier bank comprising a combination of the plurality of classifier modules corresponding to the combination of further class affiliation estimate values providing the respective highest correlation values.

31. The method according to claim 26, wherein the highest correlation is represented by a highest correlation value derived from a mathematical combination of the further class affiliation estimate values, and the further resultant classifier bank comprises a combination of the plurality of classifier modules corresponding to the combination of further class affiliation estimate values providing the highest correlation value.

32. The method according to claim 31, wherein the mathematical combination comprises a mean value of the further class affiliation estimate values.

33. The method according to claim 26, further comprising analyzing the further class affiliation estimate values using regression analysis in order to derive the combination of further class affiliation estimate values.

34. The method according to claim 18, further comprising normalizing the training data.

* * * * *

UNITED STATES PATENT AND TRADEMARK OFFICE
CERTIFICATE OF CORRECTION

PATENT NO. : 10,438,134 B2
APPLICATION NO. : 15/276531
DATED : October 8, 2019
INVENTOR(S) : David Prendergast It is certified that error appears in the above-identified patent and that said Letters Patent is hereby corrected as shown below:

In the Drawings

On sheet 6 of 8, FIG. 10, Reference Number 1010, Line 1, delete "regresion" and insert --regression--.

On sheet 7 of 8, FIG. 11, Reference Number 1016, Line 1, delete "regresion" and insert --regression--.

On sheet 8 of 8, FIG. 12, Reference Number 1204, Line 1, delete "affliation" and insert --affiliation--.

In the Specification

In Column 12, Line 48 approx., delete "$C_i$" and insert --$C_1$--.

In Column 14, Line 50, delete "$\mu)^i]$" and insert --$\mu)^r]$--.

In Column 19, Line 46, delete "validitory" and insert --validatory--.

In the Claims

In Column 21, Line 8, Claim 11, after "system" delete "apparatus".

Signed and Sealed this
Tenth Day of March, 2020

Andrei Iancu
*Director of the United States Patent and Trademark Office*